United States Patent

Wang

[11] Patent Number: 5,926,606
[45] Date of Patent: Jul. 20, 1999

[54] VCD UP-GRADING CIRCUIT BOARD FOR A CD PLAYER OR CD-ROM

[75] Inventor: Hung-Min Wang, Hsinchu, Taiwan

[73] Assignee: Winbond Electronics Corp., Hsinchu, Taiwan

[21] Appl. No.: 08/815,309

[22] Filed: Mar. 10, 1997

[51] Int. Cl.[6] .................................................. H04N 5/95
[52] U.S. Cl. ........................ 386/88; 386/84; 386/111; 386/125; 348/536; 348/845; 348/845.3
[58] Field of Search .................... 386/1, 46, 111–112, 386/125–126, 88, 84–85, 90; 348/536–537, 845.1–845.3, 423–424, 845; 360/31; H04N 5/95

[56] References Cited

U.S. PATENT DOCUMENTS

| 3,175,035 | 3/1965 | MacDonald | 386/88 |
| 4,774,575 | 9/1988 | Takayama | 358/139 |
| 4,821,123 | 4/1989 | Ogura | 360/66 |
| 5,473,385 | 12/1995 | Leske | 348/500 |
| 5,502,573 | 3/1996 | Fujinami | 358/339 |
| 5,543,853 | 8/1996 | Haskell et al. | 348/497 |
| 5,671,204 | 9/1997 | Yokouchi et al. | 369/60 |
| 5,719,646 | 2/1998 | Kikuchi et al. | 348/845.1 |
| 5,724,476 | 3/1998 | Suzuki | 386/109 |
| 5,796,441 | 8/1998 | Oshita | 348/476 |

*Primary Examiner*—Wendy Garber
*Assistant Examiner*—Vincent F. Boccio
*Attorney, Agent, or Firm*—Welsh & Katz, Ltd.

[57] ABSTRACT

A VCD up-grading circuit board for a CD player or CD-ROM includes an MPEG decoder, a microprocessor, a DRAM, an audio digital/analog converter, a TV encoder and a synchronous clock generator. The VCD up-grading circuit board for a CD player or CD-ROM is attached to the CD player or CD-ROM to allow the CD player or CD-ROM to play a VCD without additional connection between the VCD up-grading circuit board and the CD player (CD-ROM).

4 Claims, 4 Drawing Sheets

VCD UP-GRADING CIRCUIT BOARD FOR A CD PLAYER OR CD-ROM

BACKGROUND OF THE INVENTION

1. Field of the Invention

The present invention relates to a VCD up-grading circuit board, more particularly, to a VCD up-grading circuit board, which is attached to a CD player or CD-ROM thereby allowing the CD player (CD-ROM) to be up-graded to a VCD (Video CD) player without additional connection for a synchronous clock signal.

2. Description of Related Art

A VCD (Video CD) specification for a CD has been developed to provide both visual and auditory enjoyment with high quality. The VCD specification allows compressed image signals (being compressed by a proportion 20:1 for example) in addition to stereo signals to be written into an ordinary CD. To play the data written in the CD, the compressed image signals have to be decompressed by an MPEG decompression chip or decompression software, that is, a VCD player is needed. Each CD can store about 60 minutes of images and sounds. It is clear that the VCD player, which provides both video and audio services, can substitute for a CD player and a video cassette player.

However, the CD player has become a very common audio device in homes and so it is a waste to throw away the original CD player and buy a new VCD player. Accordingly, a VCD up-grading circuit board for the CD player or CD-ROM has been designed. The VCD up-grading circuit board is installed in the CD player to allow the CD player to be up-graded to function as a VCD player being able to play both a VCD and a CD. Although the up-graded CD player can not execute a function of interactive menu of the VCD specification, the player can execute all the normal operations, such as play, stop, fast forward and reverse, via the function keys on a panel of the CD player.

A conventional VCD up-grading circuit board for a CD player is shown in FIG. 1, in which a block at the left side indicates a basic structure of a conventional CD player or CD ROM 10, and a block at the right side indicates the conventional VCD up-grading circuit board 20. As can be seen in this drawing, the CD player (or CD ROM) 10 generally comprises a CD drive 13, a CPU (central processing unit) 14, an input/display section 15, a servo CD-DSP (CD-digital signal processor) 11 and an audio DAC (digital to analog converter) 12. The conventional VCD up-grading circuit board 20 comprises an MPEG decoder 21, a DRAM (dynamic RAM) 22, an 8-bit microprocessor 23, an audio DAC 24, a TV encoder 25 and a clock generator 26. There are three data lines, which are respectively a PCM serial digital data line (PCMDATA), a serial data locking clock line (BCLK), and an L/R channel sampling clock line (LRCLK), extending from a PCM interface of the CD-DSP 11 in the CD player 10. The above three data lines are connected both to the audio DAC 12 in the CD player 10, and to the MPEG decoder 21 in the VCD up-grading circuit board 20. The PCMDATA presents the data of the left channel when the LRCLK is at high level, and presents the data of the right channel when the LRCLK is at low level. Accordingly, the data of the left channel and the data of the right channel can utilize the same data line to transmit.

The formats of the data on the three data lines may be different depends on the designs by different manufacturers. For example, FIG. 2 shows the formats of the data on the three data lines provided by SONY™. Under SONY™ specification, the frequency of BCLK is 24 times the frequency of LRCLK in a half cycle, however, in some cases, it can be 16 or 32 times. PCMDATA is fetched and synchronized by BCLK. The frequency of LRCLK is 44.1 KHz, however, in some cases, 32 or 48 KHz. The data of the left channel and the data of the right channel are fetched by 16 bits, or 12, 18 or 20 bits in other cases, and arranged on the data line LRCLK. The 16 bits of valid data are located right before a channel switch point.

Returning to FIG. 1, in addition to the three data lines, a synchronous clock line 201 is connected between an X terminal of the servo CD-DSP 11 and an audio synchronous clock input terminal Y of the MPEG decoder 21. The synchronous clock line 201 is connected to the clock generator 26 to utilize a clock signal therefrom as a synchronous clock signal to synchronize the whole system. Digital video signals and audio signals output from the MPEG decoder 21 are synchronized by the synchronous clock signal. The DRAM 22 is used as a frame buffer for registering image frames or audio signals. The microprocessor 23 is used to control various operations and operation modes of the MPEG decoder 21, such as video output mode, PCM audio output mode and the like.

The synchronous clock signal is necessary as CD players and VCD up-grading circuit boards of different manufacturers have differences existing thereamong. Even CD players and VCD up-grading circuit boards provided by the same manufacturer may also fail to be synchronized due to inconsistency of quality. If the CD player 10 and the VCD up-grading circuit board 20 are asynchronous to each other, image errors, random codes, noises and distortion may happen since the VCD up-grading circuit board 20 cannot proceed data compression at real time.

The MPEG decoder 21 accepts data with an MPEG format only. The MPEG decoder 21 decompresses a received bit stream, which contains data being compressed according to MPEG compression format, into video signals and audio signals, wherein the audio signals are converted to analog audio signals by the audio DAC 24, and the video signals are converted to NSTC or PAL standard video signals, which can be directly played via a TV set, by the TV encoder 25. If the CD player 10 plays a CD containing only audio signals, the MPEG decoder 21 is inactive since the format of the data received from the servo CD-DSP 11 is not the MPEG format. At this time, the data is sent to the audio DAC 12 of the CD player 10 and is converted into analog audio signals to be played.

As mentioned above, the synchronous clock signal is generated by the clock generator 26 and is provided to the servo CD-DSP 11 and the MPEG decoder 21. However, the synchronous clock signal can also be provided by the servo CD-DSP 11 for the system to use, doing away with the clock generator 26. However, the following drawbacks still exist.

If the synchronous clock signal is provided from the servo CD-DSP 11 to the VCD up-grading circuit board 20, the CD player may often fail since the driving ability of the servo CD-DSP 11 is not sufficient. Alternatively, if the synchronous clock signal is generated by the clock generator 26 of the VCD up-grading circuit board 20, then an oscillator of the servo CD-DSP 11 must be removed, therefore increasing the labor and cost needed for installing the VCD up-grading circuit board 20. Moreover, the two conventional manners for providing a synchronous clock signal need an additional synchronous clock line (201) to be connected between the servo CD-DSP 11 and the MPEG decoder 21. Accordingly, there may be a problem of signal interference due to the additional connecting line.

SUMMARY OF THE INVENTION

One object of the present invention is to provide an improved VCD up-grading circuit board for a CD player, which is attached to the CD player so that the CD player can play a VCD or a CD. The VCD up-grading circuit board of the present invention needs no additional synchronous clock line connected between the VCD up-grading circuit board and the CD player.

Another object of the present invention is to provide an improved VCD up-grading circuit board for a CD player, which is attached to the CD player to enable the CD player to play a VCD or a CD without modification of the structure of the CD player.

In accordance with one aspect of the present invention, the VCD up-grading circuit board utilizes an L/R channel sampling clock signal LRCLK1 received from the CD player as a standard clock signal, compares a phase thereof to the phase of an L/R channel sampling clock signal LRCLK2 output from an MPEG decoder of the VCD up-grading circuit board and corrects the signal from the MPEG decoder to synchronize the CD player and the VCD up-grading circuit board.

In accordance with another aspect of the present invention, the VCD up-grading circuit board comprises a synchronous clock generator, which has a phase locked loop therein. The synchronous clock generator compares the phases of the L/R channel sampling clock signal LRCLK1 from the CD player and the L/R channel sampling clock signal LRCLK2 from the MPEG decoder, complements the phase difference and feeds the corrected signal back to the MPEG decoder, thereby synchronizing the CD player and the VCD up-grading circuit board.

Other objects, advantages and novel features of the invention will become more apparent from the following detailed description when taken in conjunction with the accompanying drawings.

DETAILED DESCRIPTION OF PREFERRED EMBODIMENT

Figure 3:
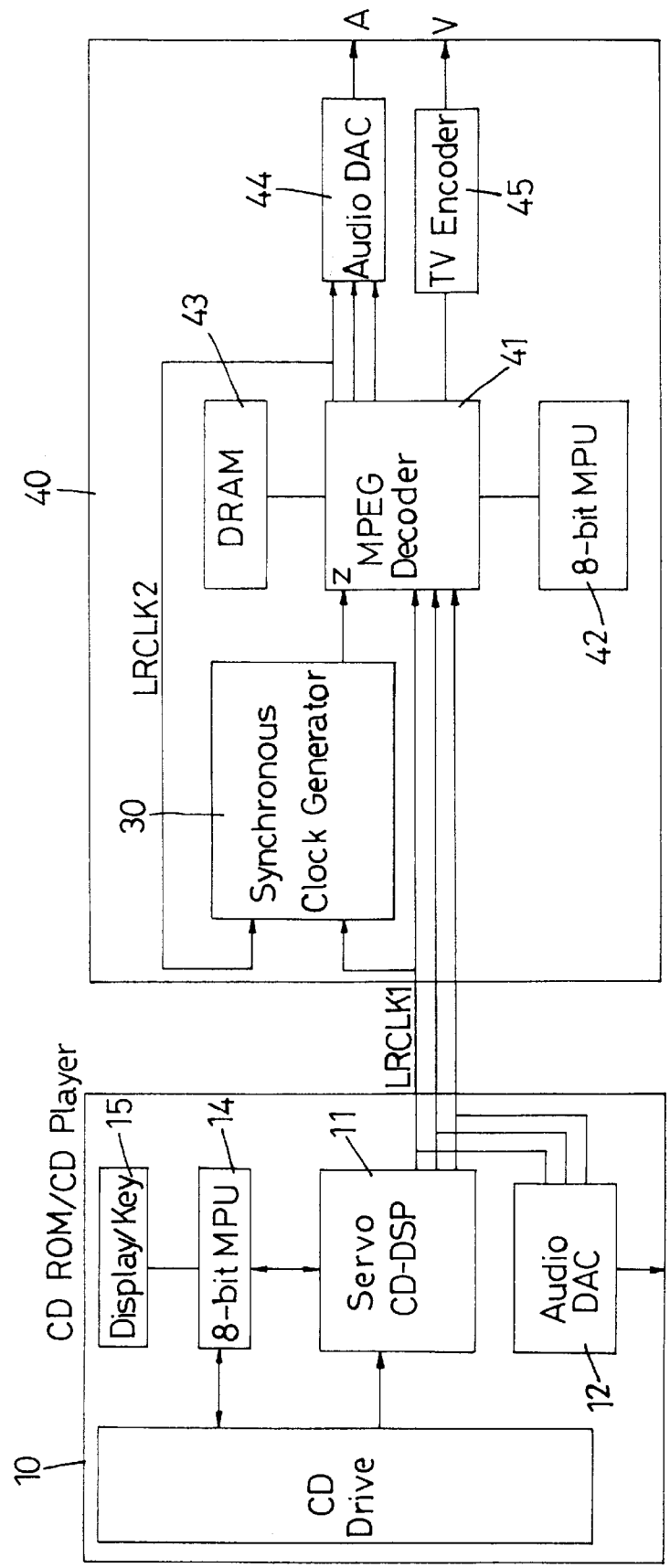
FIG. 3 is a block diagram showing connection between a CD player and a VCD up-grading circuit board in accordance with the present invention.

Referring to FIG. 3, a VCD up-grading circuit board 40 in accordance with the present invention comprises an MPEG decoder 41, an 8-bit microprocessor 42, a DRAM 43, an audio DAC 44, a TV encoder 45 and a synchronous clock generator 30. As can be seen from this drawing, the VCD up-grading circuit board 40 is connected with the CD player 10 with only three data lines PCMDATA, BCLK, and LRCLK as mentioned above. That is, an additional line connected between the CD player 10 and the VCD up-grading circuit board 40 for transmitting a synchronous clock signal is not necessary for the present invention.

Figure 1:
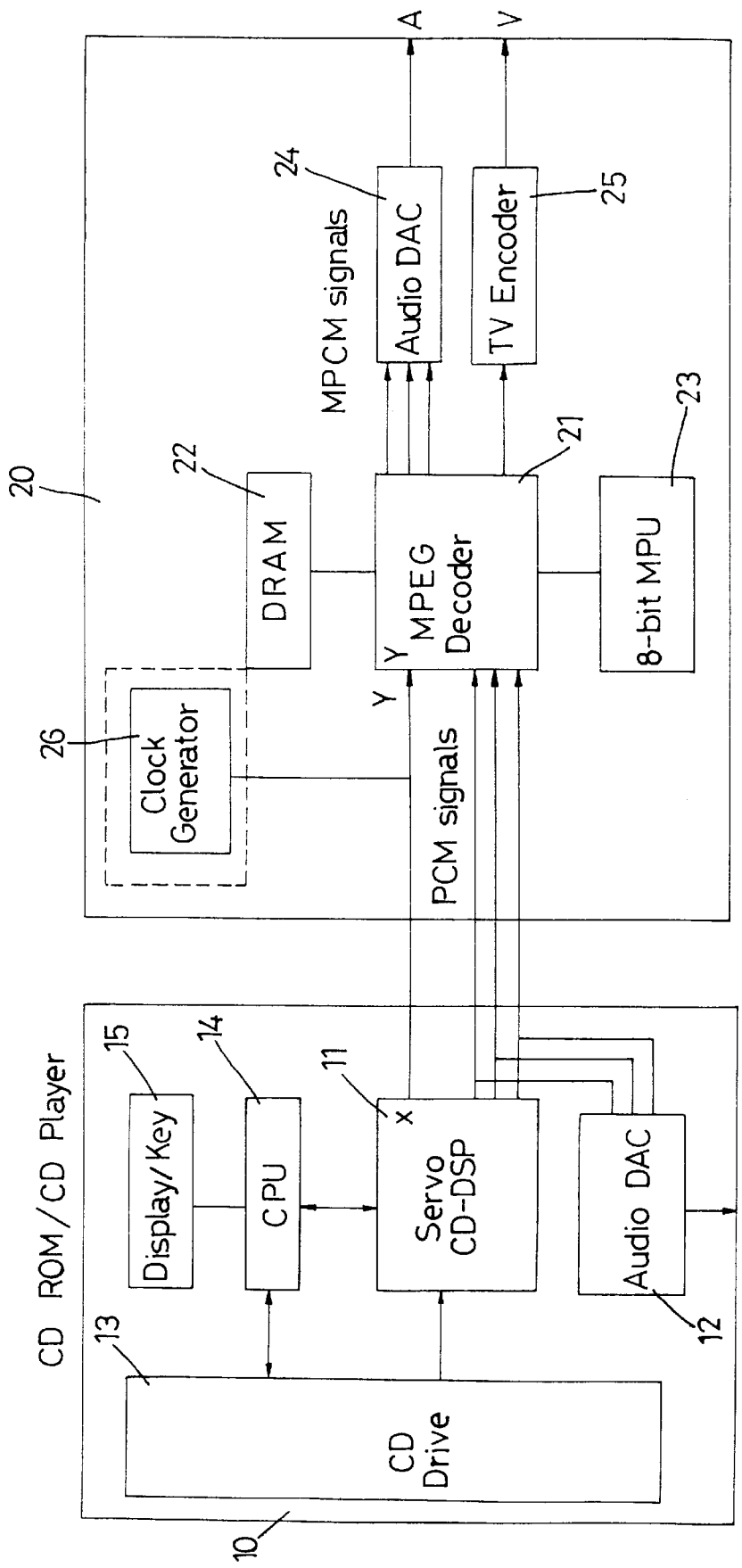
FIG. 1 is a block diagram showing connection between a CD player and a conventional VCD up-grading circuit board.
Figure 2:
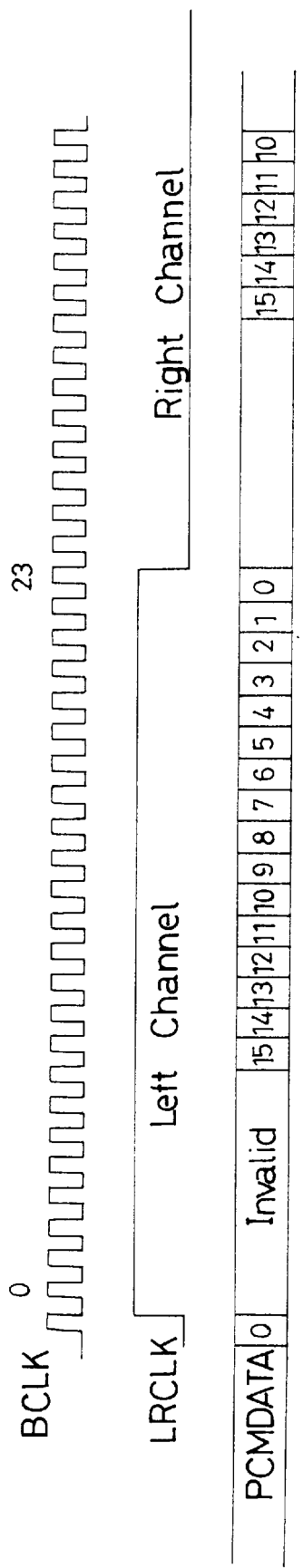
FIG. 2 is a timing diagram showing an example of data on three data lines connected between a CD player and a VCD up-grading circuit board.

The synchronous clock generator 30 is quite different from the clock generator 26 which simply generates a clock signal in FIG. 1. The synchronous clock generator 30 has two input terminals and one output terminal. An L/R channel sampling clock signal LRCLK1 from the servo CD-DSP 11 of the CD player 10 is sent to one of the input terminal, and an L/R channel sampling clock signal LRCLK2 from the MPEG decoder 41 of the VCD up-grading circuit board 40 is sent to the other input terminal. The synchronous clock generator 30 compares the phases of the above two signals, and generates a corrected clock signal based on the difference of the phases. Then the corrected clock signal generated by the synchronous clock generator 30 is fed back to a synchronous clock input terminal Z of the MPEG decoder 41. Accordingly, the L/R channel sampling clock signal LRCLK2 of the MPEG decoder 41 is continuously corrected to be synchronous with the L/R channel sampling clock signal LRCLK1 from the servo CD-DSP 11 of the CD player 10 by the synchronous clock generator 30 continuously comparing the phase difference between the two signals LRCLK1 and LRCLK2 and feeding a corrected synchronous clock signal back to the MPEG decoder 41.

Figure 4:
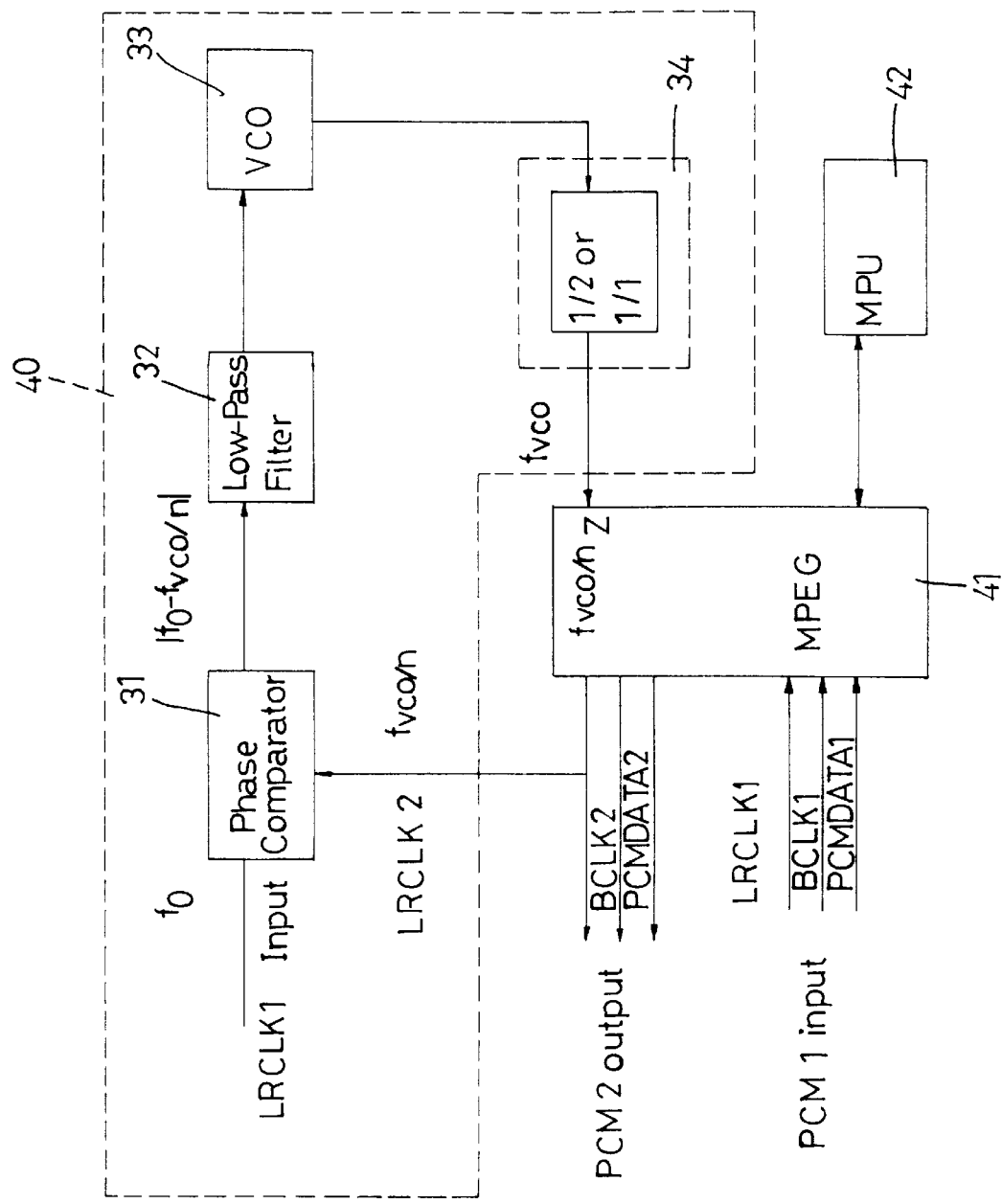
FIG. 4 is a block diagram showing a circuit design of a synchronous clock generator of the VCD up-grading circuit board in accordance with the present invention.

The interior structure of the synchronous clock generator 30 is shown in FIG. 4. The synchronous clock generator 30 comprises a phase comparator 31, a low-pass filter 32, and a voltage-controlled oscillator (VCO) 33. The comparator 31 compares the phase difference between the L/R channel sampling clock signal LRCLK1 from the servo CD-DSP 11 and the L/R channel sampling clock signal LRCLK2 from the MPEG decoder 41 and then outputs a phase difference signal. The phase difference signal is sent to the VCO 33 via the low-pass filter 32, which filters out noises and high frequency components of the phase difference signal. The VCO 33 generates a corrected oscillating (clock) frequency as the synchronous clock signal based on the phase difference signal. The oscillating frequency (synchronous clock signal) can be sent to the synchronous clock input terminal Z of the MPEG decoder 41 directly or via a frequency divider 34, which is optionally provided in the synchronous clock generator 30. In the MPEG decoder 41, the received synchronous clock signal is formed as a new L/R channel sampling clock signal LRCLK2 and serial data locking clock signal BCLK after being processed by frequency-division operation of the MPEG decoder 41.

Accordingly, a timing state of each of the signals is adjusted by continuously modifying the clock signals loaded into the synchronous clock input terminal Z of the MPEG decoder 41. That is, the L/R channel sampling clock signal of the servo CD-DSP 11 and the MPEG decoder 41 and other clock signals are synchronized by continuously comparing the phase difference between the two L/R channel sampling clock signals and continuously correcting the synchronous clock signal fed to the MPEG decoder 41. Thus, the CD player 10 and the VCD up-grading circuit board 41 are synchronized without additional connection therebetween for the synchronous clock signal.

It should be noted that the frequency divider 34 between the VCO 33 of the synchronous clock generator 30 and the synchronous clock input terminal Z of the MPEG decoder 41 is an optional device. The output waveform of the frequency divider 33 allows a completely symmetrical synchronous clock signal to be available.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A VCD up-grading circuit board for a CD player or CD-ROM comprising:

a set of PCM input ports for receiving serial digital data, a serial locking clock signal and an L/R channel sampling clock signal from the CD player or CD-ROM;

an MPEG decoder for receiving said signals from the CD player or CD-ROM and decompressing to convert said signals as video and audio signals; and a synchronous clock generator for generating a corrected oscillating clock signal as a synchronous clock signal for the MPEG decoder by taking one of said signals from the CD player or CD-ROM as a reference signal and by comparing a phase difference between the reference signal and a signal with the same format of the reference signal from the MPEG decoder.

2. The VCD up-grading circuit board as claimed in claim 1, wherein said synchronous clock generator takes said L/R channel sampling clock signal as the reference signal and compares the reference signal with an L/R channel sampling clock signal from the MPEG decoder to generate a corrected oscillating frequency as the synchronous clock signal for the MPEG decoder.

3. The VCD up-grading circuit board as claimed in claim 1, wherein said synchronous clock generator comprises a phase comparator having two input terminals, a low-pass filter and a voltage-controlled oscillator having an output terminal being coupled to a synchronous clock input terminal of the MPEG decoder connected in serial.

4. The VCD up-grading circuit board as claimed in claim 1, wherein said synchronous clock signal output from the synchronous clock generator is provided to the MPEG decoder as a synchronous clock input signal after being frequency-divided.

* * * * *